June 28, 1960 F. P. VANAMAN ET AL 2,943,233

VIDEO TRANSDUCING SYSTEM EMPLOYING A FLYING SPOT SCANNER

Filed May 26, 1958 4 Sheets-Sheet 1

INVENTORS
FRANK P. VANAMAN
BY CHARLES H. ODOM
Herman L. Gordon
ATTORNEY

INVENTORS
FRANK P. VANAMAN
CHARLES H. ODOM
BY Herman L. Gordon
ATTORNEY

VIDEO TRANSDUCING SYSTEM EMPLOYING A FLYING SPOT SCANNER

Filed May 26, 1958

INVENTORS
FRANK P. VANAMAN
BY CHARLES H. ODOM
Herman L. Gordon
ATTORNEY

VIDEO TRANSDUCING SYSTEM EMPLOYING A FLYING SPOT SCANNER

Filed May 26, 1958 4 Sheets-Sheet 4

INVENTORS
FRANK P. VANAMAN
CHARLES H. ODOM
BY Herman L. Gordon
ATTORNEY

United States Patent Office 2,943,233

Patented June 28, 1960

2,943,233

VIDEO TRANSDUCING SYSTEM EMPLOYING A FLYING SPOT SCANNER

Frank P. Vanaman and Charles H. Odom, New Hyde Park, N.Y., assignors to Television Utilities Corporation, Corona, N.Y.

Filed May 26, 1958, Ser. No. 737,932

13 Claims. (Cl. 315—20)

This invention relates to television apparatus, and more particularly to a video transducing system employing a scanner of the flying spot type.

A main object of the invention is to provide a novel and improved video transducing system of the flying spot type which is easy to operate, which may be employed to televise various kinds and sizes of visual material, which may be easily constructed as a substantially self-contained unit, which requires a minimum amount of auxiliary equipment, and which may be used to supply picture signals to an unlimited number of video monitors or television receivers within transmitting distance of the transducing system.

A further object of the invention is to provide an improved video transducing system of the flying spot type employing a kinescope as the flying spot source and being provided with circuitry to protect same and to prevent burning of its screen in the event of failure of either the vertical or horizontal sweep voltage thereof.

A still further object of the invention is to provide an improved video transducing system of the flying spot type which employs easily available optical components, which may be easily adapted to accommodate motion picture film or other transparent material, which may be easily converted to televise opaque or live material, and which may be employed to reverse negative material so that it will be displayed in positive form.

Further objects and advantages of the invention will become apparent from the following description and claims, and from the accompanying drawings, wherein:

Figure 1:
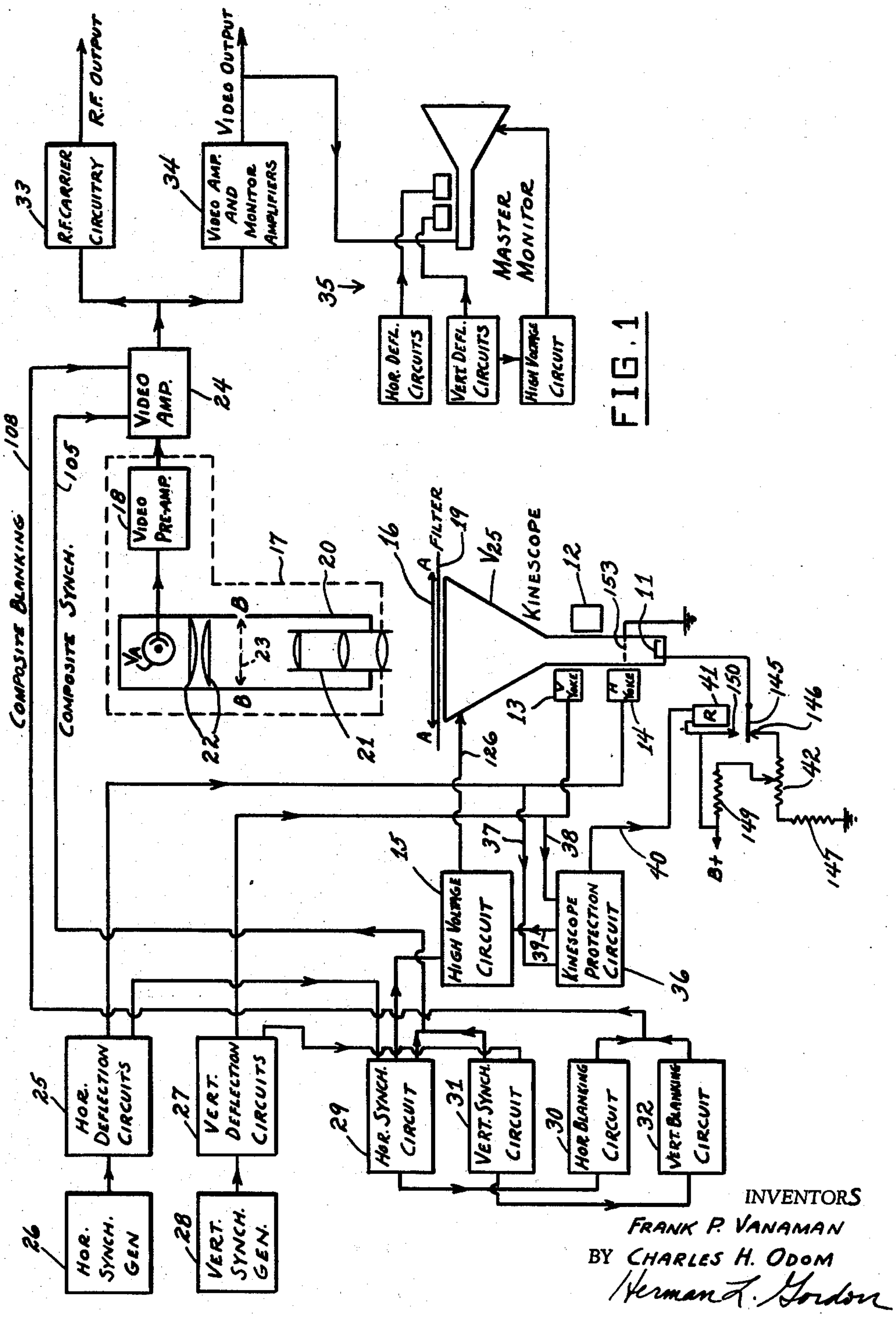
Figure 1 is a block diagram of an improved video transducing system constructed in accordance with the present invention.

A prime purpose of the present invention is to provide apparatus for the visual transmission of information carried on a transparency from a master station to one or more remote stations. As will be further explained, the apparatus can also be employed to transmit visual information from an opaque carrier to the remote stations.

The apparatus is adapted to transmit visual information in written or printed form, or information in the process of being written or drawn, or other types of visual information, such as photographs, or the like. Said apparatus provides instantaneous transmission of the visual material, eliminating the necessity of making copies and physically transporting same. The apparatus may be readily employed in conjunction with an audio channel, so that audio information, such as live or recorded spoken comments may be transmitted simultaneously with the visual material.

The apparatus of the present invention is intended for application in a large number of activities, such as the visual transmission of commercial documents from a centralized location to remote offices requiring same, the transmission of educational material, the transmission of transportation schedules and other data from communication centers, the transmission of technological information in industrial establishments, the transmission of advertising material in large stores, the transmission of training material or instructions in military or naval establishments, and the transmission of visual information in any other activity where it is desirable to convey such information instantaneously to a large number of receiving stations.

In general, the apparatus of the present invention operates as follows: The raster on the screen of a kinescope is focussed onto the transparency or other representation to be transmitted; light is collected therefrom and accurately focussed by an optical system onto the light-sensitive element of a photomultiplier tube; changes in light value produced by the representation are translated at the output of the photomultiplier tube as current changes flowing through a resistive load, said current changes being suitable for amplification to a usable level; after amplification, the resultant signals are mixed with blanking and synchronizing signals. The resultant mixed output signals can then be fed to a video monitor for display. The mixed output signals may also be used to modulate a radio frequency carrier wave which may have the frequency range of any standard television channel. The modulated radio frequency wave may be applied to any unmodified television receiver for display.

A master monitor is employed with the transducing apparatus for the convenience of operating personnel, providing a continuous check on the quality of the outgoing picture signal. Circuitry is included for the protection of the transducing kinescope to prevent burning of its screen in the event of failure of either the vertical or horizontal deflection voltages applied to the kinescope.

Referring to the drawings, Figure 1 shows in block form a typical video transducing system according to the present invention. The system comprises a kinescope $V_{25}$ which is suitably mounted, for example, in a vertical position with its screen uppermost and horizontal. Kinescope $V_{25}$ is provided with a gun structure including the cathode 11, and with focussing means, for example, the permanent-magnet focussing member 12 mounted adjacent the neck of the kinescope. The focussing field of the permanent magnet 12 may be adjusted as required, namely, to vary its strength, by the use of suitable magnetic shunts. The kinescope is provided with a vertical deflection yoke 13 and a horizontal deflection yoke 14, which may be incorporated in a conventional single-yoke assembly disposed on the neck of the kinescope. The kinescope includes a high voltage anode to which is connected the output cable of a high voltage circuit 15, presently to be described.

Suitable means, not shown, is provided to support a transparency 16, carrying information to be transmitted, in a horizontal plane A—A above and adjacent the screen of kinescope $V_{25}$. The transparency 16 may comprise a relatively large sheet of the same order of size as the raster on the screen. The kinescope is preferably of substantial size and has a screen at least 10 inches in diameter, so that the transparency 16 may be, for example, of ordinary letter size.

Suitably mounted above the kinescope $V_{25}$ is a housing 17 containing the optical components of the apparatus and the photomultiplier tube $V_A$ and its associated preamplifier 18.

A suitable filter 19, for example, an ultraviolet filter, is mounted on the screen of kinescope $V_{25}$, said filter being interposed between the transparency 16 and the screen, so as to remove undesired color components from the light derived from the raster on the screen and to limit the transmitted light to the ultraviolet portion of the spectrum.

The photomultiplier tube $V_A$ is mounted in an optical chamber 20 containing the objective assembly 21 which collects the light from the transparency 16 and projects it through condensing lenses 22, 22 to the light-sensitive element of the photomultiplier tube. The housing 17 and the optical chamber 20 are suitably slotted and are provided with means to receive a smaller transparency 23, if so desired, such as a slide or motion picture film, instead of using a large transparency 16, the light from the raster of kinescope $V_{25}$ being focussed by the lens assembly 21 through the transparency 23 at the plane B—B, as shown in Figure 1, so as to be modulated thereby and is focussed on the light-sensitive element of photomultiplier tube $V_A$ by the condensing lenses 22, 22.

The resultant signal developed by the photomultiplier tube $V_A$ is amplified in the preamplifier 18 and is further amplified in a video amplifier, shown at 24.

The horizontal deflection voltage supplied to horizontal yoke 14 is generated in horizontal deflection circuits, designated generally at 25, and may be synchronized by a horizontal synch generator, shown at 26. The vertical deflection voltage supplied to vertical yoke 13 is similarly generated in vertical deflection circuits, designated generally at 27, and may be synchronized by a vertical synch generator 28, or alternatively, by the 60 cycle supply voltage, as will be presently explained.

Horizontal synchronizing and blanking pulses are respectively developed in a horizontal synch circuit 29 and a horizontal blanking circuit 30, the synch circuit 29 receiving its input signal from the horizontal deflection stage 25, so as to be synchronized therewith. Said horizontal synch circuit 29 also supplies an input signal to the high voltage circuit 15.

The horizontal blanking circuit 30 receives its input signal from the output of the horizontal synch circuit 29.

Vertical synchronizing and blanking pulses are respectively developed in a vertical synch circuit 31 and a vertical blanking circuit 32, the vertical synch circuit 31 receiving its input signal from the vertical deflection stage 27 so as to be synchronized therewith. The vertical blanking circuit 32 receives its input signal from the output of the vertical synch circuit 31.

The outputs of the horizontal synch circuit 29 and the vertical synch circuit 31 are combined and are added to the video signal in the video amplifier 24. Similarly, the outputs of the horizontal blanking circuit 30 and the vertical blanking circuit 32 are combined and are added to said video signal in video amplifier 24.

The mixed output signal of video amplifier 24 may be fed to suitable radio frequency carrier circuitry, shown generally at 33, to produce a modulated radio frequency carrier wave of a frequency band corresponding to one of the standard television channels, so that it may be received by a conventional television receiver, and so that the information on the transparency 16 (or 23) will be displayed on the receiver viewing screen.

The mixed output signal of video amplifier 24 is also fed through video amplifier and monitor amplifier circuitry, shown generally at 34, by means of suitable cables to one or more remote video monitors for display. The output of the amplifier circuitry 34 is also fed to a master monitor 35 located adjacent the video transducing system, on the screen of which the transmitted information is displayed, providing a continuous check on the quality of the outgoing picture signal.

A kinescope protective circuit 36 forms part of the transducing system and protects the flying spot kinescope $V_{25}$ so as to prevent burning of its screen in the event of failure of either the vertical or horizontal sweep voltages applied to the deflection yoke members 13 and 14. As shown, the horizontal deflection voltage is applied at 37 to one input portion of protective circuit 36 and the vertical deflection voltage is applied at 38 to another input portion of circuit 36. The protective circuit 36 controls the high voltage circuit 15 by an output connection 39 thereof and has another output connection, designated at 40, which controls a relay device 41 arranged to control the bias voltage on the cathode 11 of kinescope $V_{25}$. As will be presently described, when relay device 41 becomes energized, as a result of the failure of either the horizontal or the vertical deflection voltage, or both, the bias voltage on cathode 11 is raised to a maximum positive value, sufficient to cut off the kinescope beam. Normal brightness of the kinescope screen is adjusted by the "brightness" control potentiometer 42.

Figures 2, 2A:
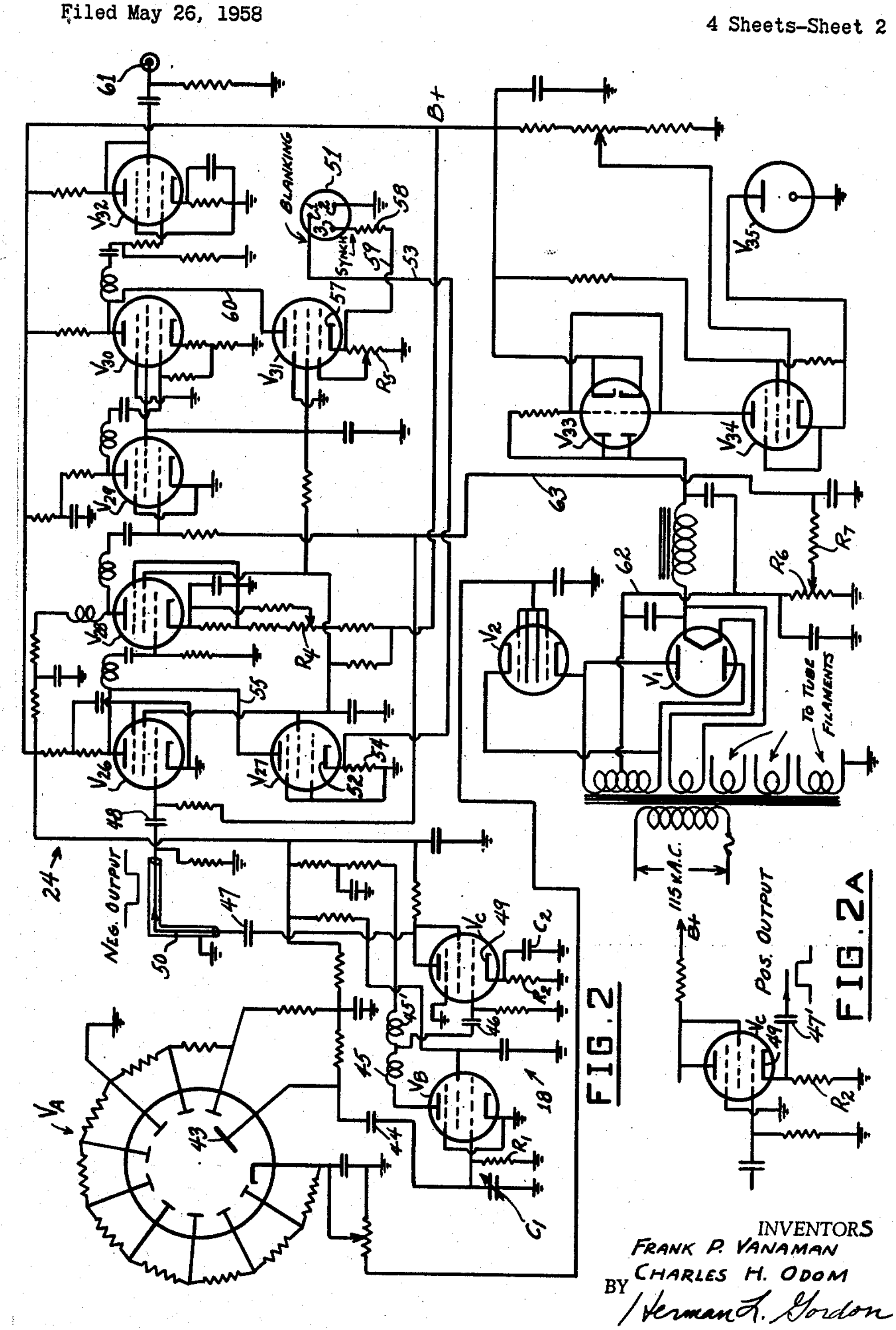
Figure 2 is a schematic diagram showing the electrical circuits of the photomultiplier tube, preamplifier, and video amplifier stages of the system of Figure 1.
Figure 2A is a schematic diagram of a portion of the preamplifier circuit, showing a modification thereof for the purpose of reversing televised negative material and displaying same in positive form by the system of the present invention.

Referring now to Figure 2, it will be seen that the output signal from the main anode 43 of photomultiplier tube $V_A$ is applied to the control grid of the first preamplifier tube $V_B$ through a coupling condenser 44. The output signal from tube $V_B$ is applied to the control grid of the second preamplifier tube $V_C$ through a peaking coil 45 and a coupling condenser 46. The output signal from the plate of tube $V_C$, in negative form, is applied through coupling condensers 47 and 48 to the control grid of the first video amplifier tube $V_{26}$.

To provide a positive-going output signal from tube $V_C$, for the purpose of reversing televised negative material and displaying same in positive form, the output from tube $V_C$ is taken at its cathode 49 and the cathode condenser $C_2$ is omitted, as shown in Figure 2A. Thus, the positive-going signal at the cathode 49 in Figure 2A is applied through a coupling capacitor 47′ and the coupling condenser 48 to the control grid of the first video amplifier tube $V_{26}$.

Connected across the input to the first preamplifier tube $V_B$ is a frequency compensation circuit comprising the parallel-connected variable condenser $C_1$ and resistor $R_1$, which is employed to attenuate the low frequencies to levels substantially of the same order as the high frequencies. In Figure 2, another compensation network comprising the parallel-connected cathode resistor $R_2$ and cathode condenser $C_2$ is employed to boost the high frequencies; these compensation networks are for the purpose of improving the linearity of response to all the frequencies involved.

Tube $V_C$ is a plate follower, used mainly for matching the output of the preamplifier 18 to the coaxial line, shown at 50, employed to transmit the preamplifier output to the input grid of the video amplifier 24.

The preamplifier 18 and video amplifier 24, as well as the photomultiplier tube $V_A$, are energized by a substantially conventional power supply circuit including the full wave rectifier $V_1$ and the conventional voltage regulating circuit including tubes $V_{33}$, $V_{34}$ and $V_{35}$, as shown. Also included is a rectifier $V_2$ of the 6BX7 type, connected to provide the high negative cathode voltage (approximately −500 volts) for the photomultiplier tube $V_A$.

The video amplifier 24 includes the tube $V_{27}$, which is employed as an amplifier for the composite blanking signal. The blanking and synchronizing pulses are supplied to the video amplifier 24 by a cable which connects to a receptacle 51 having the respective terminals 1, 2 and 3. Terminal 2 is grounded, as shown. The composite blanking signal is supplied at terminal 1 and the composite synch signal is supplied at terminal 3. The composite blanking signal is supplied to the cathode of tube $V_{27}$ by a wire 53. The composite blanking signal is thus impressed across the cathode resistor 54, the control grid of tube $V_{27}$ being grounded, whereby the amplified composite blanking signal appears at the plate of tube $V_{27}$ with the same polarity as the video signal and is added to the video signal output at the plate of the first video amplifier tube $V_{26}$ by a wire 55 connecting the plate of tube $V_{27}$ to the plate of tube $V_{26}$.

Video amplifier 24 also includes a tube $V_{31}$, which is employed as an amplifier in the same manner as tube $V_{27}$ and which receives the composite synch signal across its cathode potentiometer $R_5$, the terminal 3 of cable connector 51 being connected to the cathode 57 of tube $V_{31}$ through a resistor 58 and a wire 59. The grid of tube $V_{31}$ is connected to the adjustable contact of potentiometer $R_8$, and the amplified composite synch signal is supplied from the plate of tube $V_{31}$ to the output of the fourth video amplifier tube $V_{30}$ by a wire 60 connecting the plate of tube $V_{31}$ to the plate of tube $V_{30}$, whereby the amplified composite synch signal has the same polarity as and is added to the mixture of video signal and blanking amplified in tubes $V_{28}$, $V_{29}$ and $V_{30}$ and appearing at the plate of tube $V_{30}$. The mixture of video, blanking and synch signals is further amplified in the final tube $V_{32}$ of video amplifier 24 and is made available for transmission to the radio frequency carrier circuits 33 and the closed circuit amplifier circuits 34 at the output terminal 61.

A potentiometer $R_4$ is employed to vary the bias on the cathode of tube $V_{28}$. This varies the amplitude of the composite blanking signal without affecting the video signal, whereby said potentiometer $R_4$ serves as a blanking gain control. The potentiometer $R_5$ serves as the gain control for the composite synch signal.

A potentiometer $R_6$ connected between the negative wire 62 of the power supply and ground has its adjustable contact connected through a resistor $R_7$ to the common grid return wire 63 of the video amplifier tubes $V_{26}$ and $V_{29}$, to provide a means of adjusting the D.C. bias on the grids of said tubes.

Series-connected peaking coils 45, 45' are employed in the plate circuit of preamplifier tube $V_B$ to provide increased gain for the higher picture frequencies. Similar peaking coils are employed in the coupling circuits between the successive stages of the video amplifier 24 for the same reason.

Figure 3A:
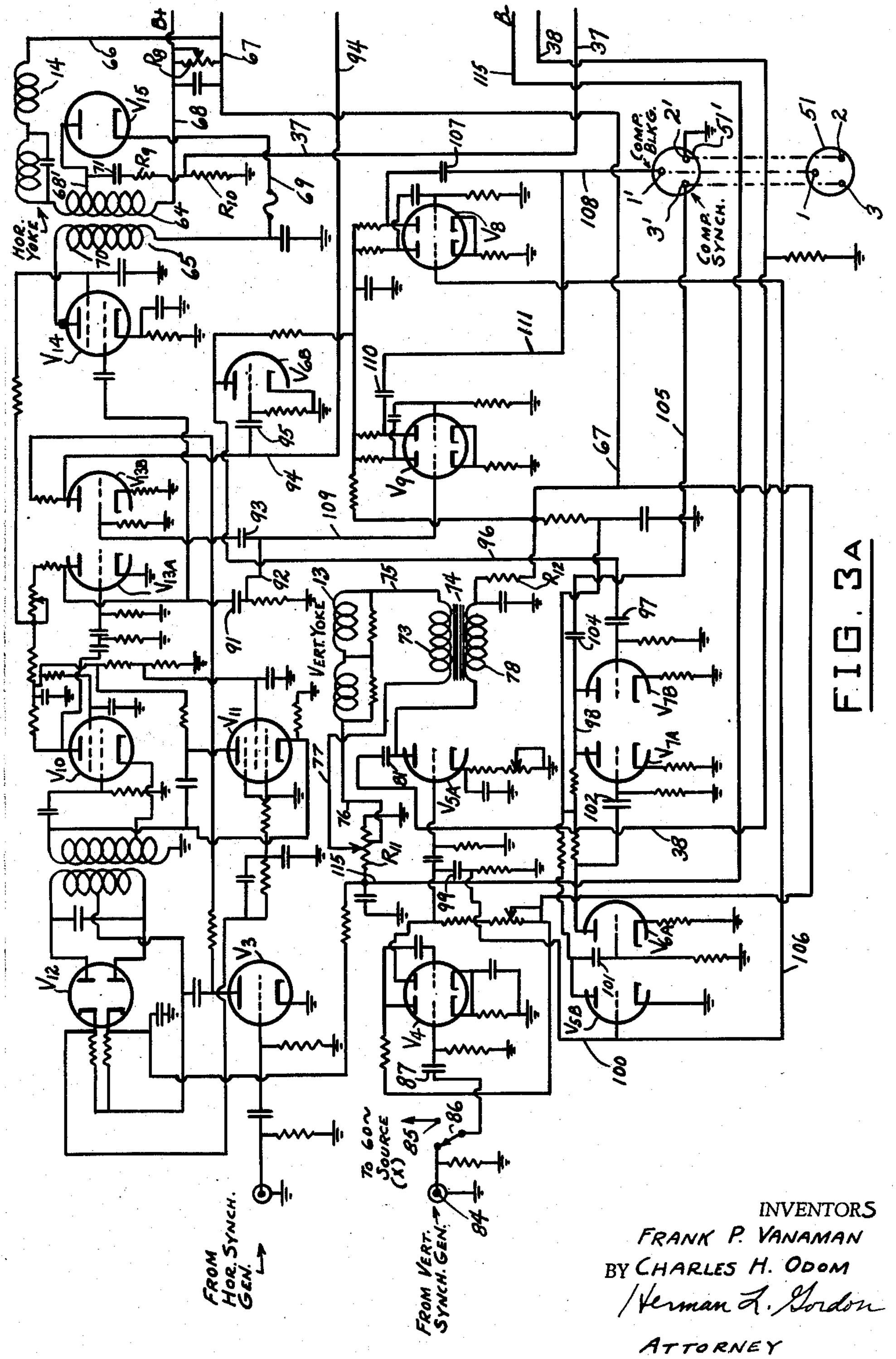
Figures 3A and 3B are complementary schematic diagrams showing the remaining electrical circuits of the system of Figure 1, Figure 3A showing the deflection, synchronizing and blanking circuits and Figure 3B showing the high voltage and kinescope protective circuits of the system.
Figure 3B:
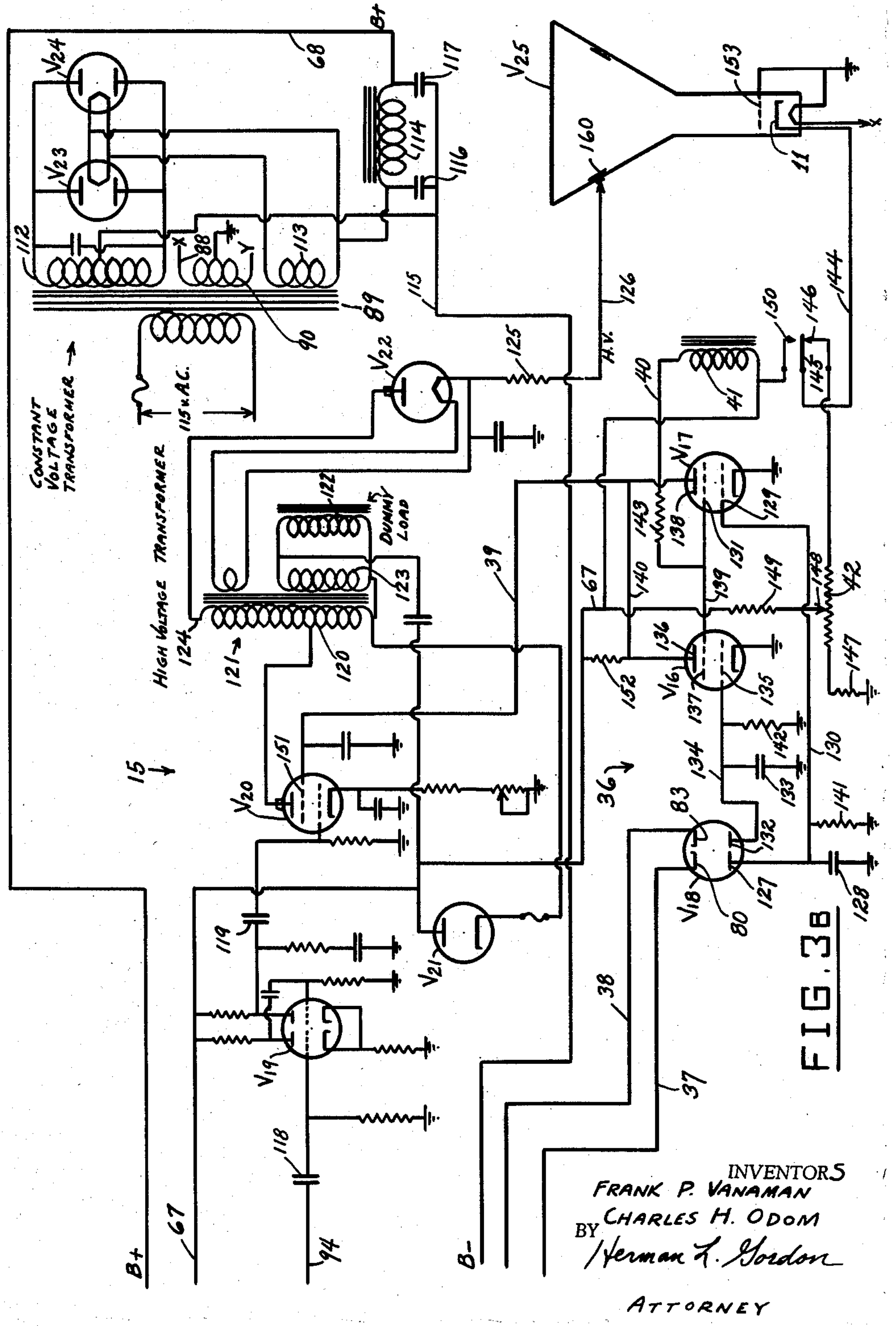

Referring now to Figure 3A, it will be seen that the horizontal deflection circuits comprise the horizontal oscillator tube $V_{10}$, the horizontal discriminator tube $V_{12}$, the reactance tube $V_{11}$, the horizontal discharge tube $V_{13A}$, the horizontal sweep output tube $V_{14}$, the damper tube $V_{15}$, and (when an external horizontal synch generator is used) the synch coupling tube $V_3$. This circuitry is conventional and provides horizontal sweep voltage in the horizontal yoke 14, which is connected to the secondary 64 of the horizontal output transformer 65 through a circuit comprising secondary 64, horizontal yoke 14, a wire 66, a wire 67, the horizontal centering rheostat $R_8$ and the positive voltage supply wire 68. The plate of the horizontal output tube $V_{14}$ is fed in a conventional manner from a tap 68' on secondary 64 through the damper tube $V_{15}$, through the cathode wire 69 and the primary 70 of transformer 65. A supervisory circuit for the horizontal sweep voltage is provided comprising a coupling condenser 71, a resistor $R_9$ and a resistor $R_{10}$ connected in series between tap 68' and ground. This circuit is tapped at the junction of resistors $R_9$ and $R_{10}$ by the connection thereto of wire 37, which is in turn connected to one cathode 80 of a double diode $V_{18}$ (Figure 3B).

The vertical deflection circuitry comprises the multivibrator tube $V_4$ and the vertical output tube $V_{5A}$, and is also conventional, providing vertical sweep voltage in the vertical yoke 13, which is connected to the secondary 73 of the vertical output transformer 74 through a circuit comprising yoke 13, a wire 75, secondary 73, a wire 76 connected to a fixed tap on the vertical centering potentiometer $R_{11}$, and a wire 77 connected to the adjustable tap of said centering potentiometer. The plate of the vertical output tube $V_{5A}$ is fed from wire 67 through a resistor $R_{12}$ and the primary 78 of output transformer 74. A supervisory circuit for the vertical sweep voltage is provided comprising a coupling condenser 81 connected between the anode of vertical output tube $V_{5A}$ and the wire 38, which is connected in turn to the remaining cathode 83 of double diode $V_{18}$ (Figure 3B).

The vertical multivibrator oscillator comprising tube $V_4$ may be synchronized either from an external vertical synch generator connected to terminal 84, or from the 60 cycle supply source connected to a terminal 85, the input grid of tube $V_4$ being selectively coupled to either terminal 84 or terminal 85 by means of a selector switch 86 whose pole is connected to said input grid through a coupling condenser 87. The 60 cycle source may comprise the output between one of the ungrounded terminals 88 of the filament winding 90 of the power transformer (Figure 3B) and ground.

The horizontal synch circuit comprises the tubes $V_{13B}$, $V_{6B}$ and $V_{7B}$. A signal from the plate of the horizontal discharge tube $V_{13A}$ is made available through a condenser 91 to a wire 92. This signal is coupled by a condenser 93 to the grid of the horizontal synch amplifier tube $V_{13B}$. The amplified synch signal appears at the plate of tube $V_{13B}$, to which is connected a wire 94. This signal is coupled through a condenser 95 to the grid of the second horizontal synch amplifier tube $V_{6B}$. The output at the plate of tube $V_{6B}$ is transmitted through a wire 96 and a coupling condenser 97 to the grid of tube $V_{7B}$. The amplified horizontal synch pulse, which is positive-going, appears at the plate of tube $V_{7B}$, to which is connected a wire 98.

The vertical synch circuit comprises the tubes $V_{5B}$, $V_{6A}$ and $V_{7A}$. A signal from the output plate of multivibrator tube $V_4$ is coupled through a condenser 99 and a wire 100 to the grid of vertical synch amplifier tube $V_{5B}$. The vertical synch signal at the plate of tube $V_{5B}$ is coupled through a condenser 101 to the grid of amplifier tube $V_{6A}$, and the signal from the plate of tube $V_{6A}$ is coupled through a condenser 102 to the grid of vertical synch amplifier tube $V_{7A}$. Tubes $V_{5B}$ and $V_{6A}$ are shaping tubes biased to clip the amplified vertical pulses so that the final pulses will be of suitable amplitude relative to the horizontal synch pulses. The resultant vertical synch signal, which is positive-going, appears at the plate of tube $V_{7A}$, which is connected to wire 98. Thus, the positive horizontal and vertical synch pulses are combined at wire 98 and are coupled through a condenser 104 to the composite synch wire 105, connected to terminal 3' of the connector 51'.

The vertical blanking circuit comprises the tube $V_8$ connected as a conventional multivibrator, keyed by the vertical synch signal in the wire 100, which is connected by a wire 106 to the input grid of tube $V_8$. The signal from the output plate of tube $V_8$ is coupled through a condenser 107 to the composite blanking signal wire 108, connected to terminal 1' of the connector 51'.

The horizontal blanking circuit comprises the tube $V_9$, also connected as a conventional multivibrator, keyed by the horizontal synch signal in the wire 92, which is connected by a wire 109 to the input grid of tube $V_9$. The signal from the output plate of tube $V_9$ is coupled through a condenser 110 and a wire 111 to the composite blanking signal wire 108.

Referring now to Figure 3B, it will be seen that the power supply for the circuits shown in Figures 3A and 3B comprises the constant-voltage supply transformer 89 having the filament-current supply secondary winding 90 and the plate current supply secondary winding 112, connected as a full wave rectifier to the plates of the parallel rectifier tubes $V_{23}$ and $V_{24}$, as shown. The filaments of the rectifier tubes $V_{23}$ and $V_{24}$ are energized from the secondary winding 113 of transformer 89, and the positive voltage wire 68 is connected through the filter choke 114 to one terminal of said filament winding. The negative wire, shown at 115, is connected in the usual manner to the center tap of secondary 112. Suitable filter condensers 116 and 117 are connected between wire 115 and the respective terminals of filter choke 114. Negative wire 115 is connected to ground (Figure 3A) through the vertical centering potentiometer $R_{11}$.

The high voltage circuit 15 for kinescope $V_{25}$ comprises the tubes $V_{19}$, $V_{20}$, $V_{21}$ and $V_{22}$. Tube $V_{19}$ is connected as a conventional multivibrator, and its input grid receives horizontal synch pulses from the plate of horizontal synch amplifier tube $V_{13B}$ through the wire 94 and a coupling condenser 118. The output of multivibrator tube $V_{19}$ is coupled to the grid of the output amplifier tube $V_{20}$ through a coupling condenser 119. Positive voltage is applied to the plate of output tube $V_{20}$ from the wire 68 through rheostat $R_8$, wire 67, diode $V_{21}$ and a portion of the primary winding 120 of the conventional high voltage transformer 121. An inductance 122 is connected as a dummy load across the secondary 123 of transformer 121 to take the place of the horizontal deflection yoke normally employed with the transformer. The high alternating voltage induced in the primary 120 is rectified by a conventional high voltage rectifier tube $V_{22}$, the high voltage output terminal 124 of primary 120 being connected to the anode of tube $V_{22}$ and the rectified high voltage from the cathode of tube $V_{22}$ being applied to the high voltage anode 160 of kinescope $V_{25}$ through a resistor 125 and the wire 126.

The kinescope protection circuit 36 comprises the control tubes $V_{16}$ and $V_{17}$ and the double diode $V_{18}$.

A portion of the horizontal sweep voltage from the plate of tube $V_{15}$ is fed through wire 37 to the cathode 80 of the double diode $V_{18}$, whereby the rectified horizontal sweep voltage appears at plate 127 and becomes a steady negative D.C. potential because of the charging action of a condenser 128 connected between said plate and ground. Plate 127 is connected to the grid 129 of control tube $V_{17}$ by a wire 130. The amplitude of this voltage is proportional to the amplitude of the horizontal sweep voltage, and when the horizontal sweep voltage is normal, is sufficient to maintain tube $V_{17}$ at cut-off; when the negative voltage on grid 129 drops below the cut-off value, $V_{17}$ draws plate current, and for the same reason, the screen 131 of tube $V_{17}$ likewise draws current.

Similarly, a portion of the vertical deflection voltage is applied to the cathode 83 of tube $V_{18}$ through the wire 38. The associated plate 132 rectifies the vertical deflection voltage and charges a condenser 133 connected between plate 132 and ground, developing a steady negative D.C. voltage which is applied by a wire 134 to the grid 135 of control tube $V_{16}$, maintaining said tube cut off while the vertical deflection voltage is normal. When the vertical sweep voltage drops below normal value, the negative voltage on grid 135 drops below cut-off value, allowing the plate 136 and screen 137 of tube $V_{16}$ to draw current.

The screens 131 and 137 are connected together by a wire 139 and the plate 136 and the plate 138 are connected together by a wire 140.

Respective discharge resistors 141 and 142 are connected across the condensers 128 and 133.

The winding of relay 41 is connected between the screen wire 139 and the positive voltage supply wire 67 through a screen resistor 143 and the wire 40. The grid 153 of kinescope $V_{25}$ is grounded, as shown, and is therefore negative relative to cathode 11. Cathode 11 of kinescope $V_{25}$ is connected by a wire 144 to the armature 145 of relay 41. Armature 145 normally engages lower contact 146, which is connected through the "brightness" control potentiometer 42 and a resistor 147 to ground. The adjustable contact 148 of potentiometer 42 is connected to the positive voltage supply wire 67 through a resistor 149, whereby the brightness of the raster on the screen of the kinescope may be adjusted in the usual manner by adjusting the normal positive voltage on cathode 11, whereby to adjust the negative bias on the grounded grid 153. The upper contact 150 of relay 41 is connected directly to the positive voltage supply wire 67, whereby maximum positive voltage, of the order of 350 volts, is applied to cathode 11 responsive to the energization of relay 41; this occurs when either screen 131 or 137 draws current, whereby the kinescope beam is automatically cut off responsive to the dropping of either of the deflection voltages below respective predetermined values.

As shown, the screen 151 of the high voltage output tube $V_{20}$ is connected by wire 39 to wire 140, which in turn is connected through a resistor 152 to the positive voltage supply wire 67. In the absence of plate current in either tube $V_{16}$ or $V_{17}$, the voltage drop across resistor 152 is relatively small, whereby normal screen voltage exists on screen 151 of tube $V_{20}$. When either plate 136 or 138 draws current, as a result of the dropping of either of the deflection voltages below a predetermined value, this current, flowing through the resistor 152, causes a voltage drop through said resistor sufficient to substantially reduce the voltage on screen 151, whereby the output of tube $V_{20}$ drops, reducing the high voltage at the high voltage connector cable 126 accordingly, and being effective to extinguish the kinescope beam when either of the deflection voltages drops excessively below its normal value.

Thus, the protection circuit 36 automatically cuts off the kinescope beam and reduces the high voltage applied thereto responsive to the failure of either deflection voltage, avoiding any danger of burning the kinescope screen.

In the event of the shorting of either of the control tubes $V_{16}$ or $V_{17}$, the same protective effects occur.

In a typical embodiment of the invention, the components of the circuitry shown in Figure 2 and mentioned specifically above had the following values:

| | | |
|---|---|---|
| Condenser 47 | mfds | 40 |
| Condenser 44 | mfds | .047 |
| Condenser $C_1$ | mmfds | 390 to 1390 |
| Condenser $C_2$ | mmfds | 370 |
| Condenser 46 | mfds | .047 |
| Condenser 48 | mfds | .047 |
| Resistor $R_1$ | ohms | 560 |
| Resistor $R_2$ | do | 100 |
| Resistor 54 | do | 4700 |
| Potentiometer $R_4$ | do | 10,000 |
| Potentiometer $R_5$ | do | 500 |
| Resistor 58 | do | 270 |
| Resistor $R_7$ | do | 15,000 |
| Potentiometer $R_6$ | do | 20 |

The tubes employed in the circuit of Figure 2 were as follows:

| | |
|---|---|
| Tube $V_A$ | 1P21 Photomultiplier. |
| Tube $V_B$ | 6AK5. |
| Tube $V_C$ | 6CL6. |
| Tube $V_1$ | 5R4. |
| Tube $V_2$ | 6BX7. |
| Tube $V_{26}$ | 6AH6. |
| Tube $V_{27}$ | 6BC5. |
| Tube $V_{28}$ | 6AU6. |
| Tube $V_{29}$ | 6BC5. |
| Tube $V_{30}$ | 6AH6. |
| Tube $V_{31}$ | 6AG7. |
| Tube $V_{32}$ | 6AS7. |
| Tube $V_{33}$ | 6AU6, |
| Tube $V_{34}$ | OA2. |
| Tube $V_{35}$ | |

In the modified circuit shown in Figure 2A, the following values were used:

| | |
|---|---|
| Resistor $R_2$ | 100 ohms. |
| Condenser 47′ | 1000 mfds., 6 volts. |

In the typical embodiment of the invention, the components of the circuitry shown in Figure 3A and mentioned specifically above had the following values:

| | | |
|---|---|---|
| Condenser 71 | mmfds | 8.2 |
| Condenser 95 | mfds | .0047 |
| Condenser 93 | mfds | .001 |
| Condenser 91 | mmfds | 680 |
| Condenser 87 | mfds | .25 |
| Condenser 99 | mfds | .1 |
| Condenser 101 | mfds | .047 |
| Condenser 102 | mfds | .5 |
| Condenser 104 | mfds | 40 |
| Condenser 97 | mfds | .5 |
| Condenser 81 | mfds | .01 |
| Condenser 110 | mfds | .01 |
| Condenser 107 | mfds | .25 |
| Resistor $R_9$ | ohms | 100,000 |
| Resistor $R_{10}$ | do | 4700 |
| Rheostat $R_8$ | do | 100 |
| Potentiometer $R_{11}$ | do | 20 |
| Resistor $R_{12}$ | do | 4700 |

The tubes employed in the circuit of Figure 3A were as follows:

| | |
|---|---|
| Tube $V_3$ | 6C4 |
| Tube $V_4$ | 12AU7 |
| Tube $V_{5A}$, $V_{5B}$ | 6BX7 |
| Tube $V_{6A}$, $V_{6B}$ | 12AV7 |
| Tube $V_{7A}$, $V_{7B}$ | 12BH7 |
| Tube $V_8$ | 12AU7 |
| Tube $V_9$ | 12AU7 |
| Tube $V_{10}$ | 6AQ5 |
| Tube $V_{11}$ | 6AH6 |
| Tube $V_{12}$ | 6AL5 |
| Tube $V_{13A}$, $V_{13B}$ | 12AU7 |
| Tube $V_{14}$ | 6BG6 |
| Tube $V_{15}$ | 6W4 |

In the typical embodiment of the invention, the components of the circuitry shown in Figure 3B and specifically mentioned above had the following values:

| | | |
|---|---|---|
| Condenser 118 | mmfds | 150 |
| Condenser 119 | mfds | .015 |
| Condenser 116 | mfds | 40 |
| Condenser 117 | mfds | 40 |
| Condenser 128 | mfds | .0047 |
| Condenser 133 | mfds | .01 |
| Resistor 141 | megohms | 1 |
| Resistor 142 | do | 1 |
| Resistor 143 | ohms | 30,000 |
| Resistor 149 | do | 270,000 |
| Potentiometer 42 | do | 100,000 |
| Resistor 147 | do | 22,000 |
| Resistor 152 | do | 6800 |

The tubes employed in the circuit of Figure 3B were as follows:

| | |
|---|---|
| Tube $V_{16}$ | 6CL6 |
| Tube $V_{17}$ | 6CL6 |
| Tube $V_{18}$ | 6AL5 |
| Tube $V_{19}$ | 12AU7 |
| Tube $V_{20}$ | 6CD6 |
| Tube $V_{21}$ | 6AU4 |
| Tube $V_{22}$ | 1B3 |
| Tube $V_{23}$ | 5U4 |
| Tube $V_{24}$ | 5U4 |

The apparatus of the present invention may be readily adapted for televising opaque material by projecting the raster on the screen of the kinescope by a suitable lens system onto the opaque material to be televised and by then collecting the light rays reflected from the material and focussing them, by means of another suitable lens system, onto the light-sensitive element of the photomultiplier tube $V_A$. The circuitry remains essentially the same as above described, except that it may be desirable to employ a kinescope having a relatively high instantaneous light spot intensity, which may therefore involve the use of a kinescope having a relatively small screen, requiring a different type of focussing than that above described in connection with the kinescope $V_{25}$. For example, the kinescope may employ electrostatic focussing, in which case, an additional high voltage D.C. power supply must be employed to provide the focussing potential, which may be of the order of 7000 volts.

While a specific embodiment of a video transducing system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a video transducing system of the character described, a flying spot source of light comprising a kinescope provided with a screen, a cathode, a high voltage anode adjacent said screen, a grid between said cathode and anode, and means connected to said cathode, high voltage anode and grid and being constructed and arranged to generate an electron beam from said cathode to said screen, means normally placing a voltage on said cathode which is positive with respect to said grid but which is insufficient to cut off said electron beam, beam deflection means associated with said kinescope, a source of periodic deflection voltage connected to said beam deflection means, a control tube, means to maintain said control tube non-conducting when the amplitude of said deflection voltage is above a predetermined value, means to cause said control tube to conduct when said amplitude drops below said predetermined value, and means increasing the positive voltage on the cathode to a value sufficient to extinguish said electron beam responsive to conduction of said control tube.

2. In a video transducting system of the character described, a flying spot light source comprising a kinescope provided with a screen, a cathode, a high voltage anode adjacent said screen, a grid between said cathode and anode, and means connected to said cathode, high voltage anode and grid and being constructed and arranged to generate an electron beam from said cathode to said screen, means normally placing a voltage on said cathode which is positive with respect to said grid but which is insufficient to cut off said electron beam, beam deflection means associated with said kinescope, a source of periodic deflection voltage connected to said beam deflection means, a normally non-conducting control tube, means increasing the positive voltage on the cathode to a value sufficient to extinguish said beam responsive to the conduction of said control tube, means to maintain said control tube non-conducting while the amplitude of the deflection voltage is above a predetermined value, and means to cause said control tube to conduct responsive to the decline of the amplitude of the deflection voltage below said predetermined value.

3. In a video transducing system of the character described, a flying spot light source comprising a kinescope provided with a screen, a cathode, a high voltage anode adjacent said screen, a grid between said cathode and anode, and means connected to said cathode, high voltage anode and grid and being constructed and arranged to generate an electron beam from said cathode to said screen, means normally placing a voltage on said cathode which is positive with respect to said grid but which is insufficient to cut off said electron beam, beam deflection means associated with said kinescope, a source of periodic deflection voltage connected to said beam deflection means, a control tube, means increasing the positive voltage on the cathode to a value sufficient to extinguish said electron beam responsive to conduction of said control tube, means to rectify the deflection voltage and to derive therefrom a steady D.C. potential of a magnitude in accordance with the amplitude of the deflection voltage, means applying said D.C. potential to said control tube, and means to maintain said control tube non-conducting unless said D.C. potential drops below a predetermined value.

4. In a video transducing system of the character described, a flying spot light source comprising a kinescope provided with a screen, a cathode, a high voltage anode adjacent said screen, a grid between said cathode and anode, and means connected to said cathode, high voltage anode and grid and being constructed and arranged to generate an electron beam from said cathode to said screen, means normally placing a voltage on said cathode which is positive with respect to said grid but which is insufficient to cut off said electron beam, beam deflection means associated with said kinescope, a source of periodic deflection voltage connected to said beam deflection means, a normally non-conducting control tube having a cathode, a control grid and an output anode, means increasing the positive voltage on the cathode to a value sufficient to extinguish said election beam responsive to current flow between said last-named cathode and said output anode, means deriving a steady negative D.C. voltage in accordance with the amplitude of the deflection voltage, means to apply same to said control grid, said negative D.C. voltage being sufficient to prevent current flow between said last-named cathode and said output anode unless the amplitude of the deflection voltage drops below a predetermined value.

5. In a video transducing system of the character described, a flying spot light source comprising a kinescope provided with a screen, a cathode, a high voltage anode adjacent said screen, and a grid between said cathode and said anode, a high voltage circuit comprising an output amplifier tube, a multivibrator drivingly connected to said output amplifier tube, a step-up transformer having its primary circuit connected to the output of said output amplifier tube and having a rectifier connected in circuit with its secondary, whereby to provide rectified high voltage at the output of the rectifier, means connecting the output of the rectifier to said anode, means connected to said cathode, high voltage anode and said grid and being constructed and arranged to generate an electron beam from said cathode to said screen, beam deflection means associated with said kinescope, a source of periodic deflection voltage connected to said beam deflection means, means to derive a D.C. potential in accordance with the amplitude of said deflection voltage, and means to control the amplification of said output amplifier tube in accordance with the value of said D.C. potential.

6. In a video transducing system of the character described, a flying spot light source comprising a kinescope provided with a screen, a cathode, a high voltage anode adjacent said screen, and a grid between said cathode and said anode, a high voltage source connected to said anode, beam deflection means associated with said kinescope, a source of periodic deflection voltage connected to said beam deflection means, means to derive a D.C. potential in accordance with the amplitude of said deflection voltage, means normally placing a voltage on said cathode which is positive with respect to said grid, and means to substantially increase said positive voltage when said D.C. potential decreases below a predetermined value.

7. In a video transducing system of the character described, a flying spot light source comprising a kinescope provided with a screen, a cathode, a high voltage anode adjacent said screen, and a grid between said cathode and anode, a high voltage source connected to said anode, beam deflection means associated with said kinescope, a source of periodic deflection voltage connected to said beam deflection means, means to derive a D.C. potential in accordance with the amplitude of said deflection voltage, bias voltage means connected between said cathode and grid and placing a voltage on said cathode which is positive with respect to said grid, and means to simultaneously decrease the voltage from said high voltage source and substantially increase the positive voltage on said cathode responsive to the decrease of said D.C. potential below a predetermined value.

8. In a video transducing system of the character described, a flying spot light source comprising a kinescope, a high voltage circuit comprising an output amplifier tube, a multivibrator drivingly connected to said output tube, a step-up transformer having its primary circuit connected to the output of said output amplifier tube and having a rectifier connected in circuit with its secondary, whereby to provide rectified high voltage at the output of the rectifier, means connecting the output of the rectifier to said kinescope, beam deflection means operatively associated with said kinescope, a source of deflection voltage connected to said beam deflection means, and means controlling said high voltage circuit to regulate the amplification of said output amplifier tube in accordance with the magnitude of the deflection voltage.

9. In a scanning system of the character described, a kinescope provided with a screen, a cathode, a high voltage anode adjacent said screen, a grid between said cathode and anode, means connected to said cathode, high voltage anode and said grid and being constructed and arranged to generate an electron beam from said cathode to said screen, means normally placing a voltage on said cathode which is positive with respect to said grid but which is insufficient to cut off said electron beam, beam deflection means associated with said kinescope, a source of periodic deflection voltage connected to said beam deflection means, a normally non-conducting control tube, means to maintain said control tube non-conducting when the amplitude of said deflection voltage is above a predetermined value, means to cause said control tube to conduct when said amplitude declines below said predetermined value, and means increasing the positive voltage on the cathode to a value sufficient to extinguish said electron beam responsive to conduction of said control tube.

10. In a scanning system of the character described, a kinescope provided with a screen, a cathode, a high voltage anode adjacent said screen, and a grid between said cathode and anode, a high voltage circuit comprising an output amplifier tube, a multivibrator drivingly connected to said output amplifier tube, a step-up transformer having its primary circuit connected to the output of said output amplifier tube and having a rectifier connected in circuit with its secondary, whereby to provide rectified high voltage at the output of the rectifier, means connecting the output of the rectifier to said anode, means connected to said cathode, high voltage anode and said grid and being constructed and arranged to generate an electron beam from said cathode to said screen, beam deflection means operatively associated with said kinescope, a source of periodic deflection voltage connected to said beam deflection means, means to derive a D.C. potential in accordance with the amplitude of said deflection voltage, and means to control the amplification of said output amplifier tube in accordance with the value of said D.C. potential.

11. In a scanning system of the character described, a kinescope provided with a screen, a cathode, a high voltage anode adjacent said screen, and a grid between said cathode and anode, a high voltage source connected to said anode, means connected to said cathode, high voltage anode and said grid and being constructed and arranged to generate an electron beam from said cathode to said screen, beam deflection means operatively associated with said kinescope, a source of periodic deflection voltage connected to said beam deflection means, means to derive a D.C. potential in accordance with the amplitude of said deflection voltage, bias voltage means connected between said cathode and grid and placing a voltage on said cathode which is positive with respect to said grid, and means to simultaneously decrease the voltage from said high voltage source and substantially increase the positive voltage on said cathode responsive to the decrease of said D.C. potential below a predetermined value.

12. In a scanning system, a kinescope provided with a screen, a cathode, a high voltage anode adjacent said screen, a grid between the cathode and the anode, a source of high voltage connected to said anode, and means to provide an electron beam from said cathode to said screen, means normally placing a voltage on said cathode which is positive with respect to said grid but which is insufficient to cut off said electron beam, beam deflection means disposed adjacent said kinescope, a source of periodic deflection voltage connected to said beam deflection means, means to derive a negative D.C. potential in accordance with the amplitude of said deflection voltage, a normally non-conducting control tube having a plate, a screen, a control grid and a cathode, means applying said negative D.C. potential to said control grid, said negative potential normally being sufficient to prevent conduction of the control tube, means causing the control tube to conduct when said negative D.C. potential declines below a predetermined value, a current source, relay means, means to increase the positive voltage on the kinescope cathode to a value sufficient to cut off said beam responsive to energization of the relay means, means applying positive potential from said current source to the control tube plate and screen, and means connecting said relay means in circuit with said current source between said control tube screen and the control tube cathode to receive screen current and being constructed and arranged to energize said relay means by the screen current of said control tube when the control tube conducts.

13. In a scanning system, a kinescope provided with a screen, a cathode, a high voltage anode adjacent said screen, a grid between the cathode and the anode, a high voltage circuit comprising an output amplifier tube, a multivibrator drivingly connected to said output amplifier tube, a step-up transformer having its primary circuit connected to the output of said amplifier tube and having a rectifier connected in circuit with its secondary, whereby to provide rectified high voltage at the output of the rectifier, means connecting the output of the rectifier to said anode, and means to provide an electron beam from said cathode to said screen, means normally placing a voltage on said cathode which is positive with respect to said grid but which is insufficient to cut off said electron beam, beam deflection means disposed adjacent said kinescope, a source of periodic deflection voltage connected to said beam deflection means, means to derive a negative D.C. potential in accordance with the amplitude of said deflection voltage, a control tube having a plate, a screen, a control grid and a cathode, means applying said negative D.C. potential to said control grid, said negative potential normally being sufficient to prevent conduction of the control tube but allowing the control tube to conduct when it declines below a predetermined value, a current source, relay means, means to increase the positive voltage on the kinescope cathode to a value sufficient to cut off said beam responsive to the energization of the relay means, means applying positive potential from said current source to the control tube plate and screen, means connecting said relay means in circuit with said current source between said control tube screen and the control tube cathode and being constructed and arranged to energize said relay means by the screen current of said control tube when the control tube conducts, a dropping resistor connected in circuit with the plate of the control tube, whereby a substantial drop in voltage on the control tube plate occurs when the control tube conducts, and means controlling the amplification of said output amplifier tube in accordance with the voltage on said control tube plate.

References Cited in the file of this patent

UNITED STATES PATENTS

| | | |
|---|---|---|
| 2,514,079 | Lockhart | July 4, 1950 |
| 2,709,768 | King | May 31, 1955 |
| 2,829,199 | Baracket et al. | Apr. 1, 1958 |
| 2,860,283 | Horowitz | Nov. 11, 1958 |

FOREIGN PATENTS

| | | |
|---|---|---|
| 452,730 | Great Britain | Aug. 28, 1936 |